United States Patent
Zhou et al.

(10) Patent No.: US 11,075,699 B2
(45) Date of Patent: Jul. 27, 2021

(54) PHASE NOISE TOLERANT COHERENT MODULATION FORMATS FOR SHORT REACH OPTICAL COMMUNICATION SYSTEMS

(71) Applicant: Google LLC, Mountain View, CA (US)

(72) Inventors: Xiang Zhou, Sunnyvale, CA (US); Hong Liu, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/939,555

(22) Filed: Jul. 27, 2020

(65) Prior Publication Data
US 2020/0366375 A1 Nov. 19, 2020

Related U.S. Application Data

(62) Division of application No. 16/415,792, filed on May 17, 2019, now Pat. No. 10,778,337.

(51) Int. Cl.
*H04B 10/00* (2013.01)
*H04B 10/516* (2013.01)
(Continued)

(52) U.S. Cl.
CPC ... *H04B 10/5161* (2013.01); *H04B 10/07953* (2013.01); *H04B 10/275* (2013.01); *H04B 10/60* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,085,500 | B2 * | 8/2006 | Spickermann | H04B 10/50 398/183 |
| 8,369,448 | B2 * | 2/2013 | Zhang | H04L 27/34 375/298 |

(Continued)

FOREIGN PATENT DOCUMENTS

| CN | 109246044 A | 1/2019 |
|---|---|---|
| WO | 2014124880 A1 | 8/2014 |

OTHER PUBLICATIONS

Ling, et al. "Digital quadrature amplitude modulation with optimized non-rectangular constellations for 100 Gb/s transmission by a directly-modulated laser", published Apr. 29, 2014 May 5, 2014 | vol. 22, No. 9 |Optics Express 10844, pp. 1-14.

(Continued)

*Primary Examiner* — Agustin Bello
(74) *Attorney, Agent, or Firm* — Lerner, David, Littenberg, Krumholz & Mentlik, LLP

(57) ABSTRACT

Systems and methods are disclosed herein for coherently modulating and demodulating coherent optical signals using 5-bit constellations. The 5-bit constellations have improved suitability for short reach optical communications systems. A first 5-bit constellation can be formed from four rings. The first and fourth rings can form quadrature phase-shift keyed four-symbol sub-constellations, and the second and third rings can form phase-shift keyed twelve symbol constellations. Symbols from the third and fourth sub-constellations are arranged to form a square. A second 5-bit constellation can include an inner 16 symbol sub-constellation and an sixteen symbol outer sub-constellation. Each of the symbols of the inner sub-constellation are equally spaced from its nearest neighboring symbols along both the quadrature and in-phase axes. Each of the symbols in the outer constellation (Continued)

Schematic illustration of the proposed modified cross-32QAM modulation format

Modified Cross-32QAM has an equal euclidean-distance with its nearest neighboring symbols in the outer sub-constellation.

9 Claims, 7 Drawing Sheets

(51) Int. Cl.
*H04B 10/079* (2013.01)
*H04B 10/275* (2013.01)
*H04B 10/60* (2013.01)

(56) References Cited

U.S. PATENT DOCUMENTS

| | | | | |
|---|---|---|---|---|
| 8,923,445 | B1* | 12/2014 | Abbaszadeh | H04L 27/38 |
| | | | | 375/322 |
| 9,025,651 | B1* | 5/2015 | Dave | H04B 10/2569 |
| | | | | 375/229 |
| 9,031,168 | B1* | 5/2015 | Liu | H04L 27/3483 |
| | | | | 375/329 |
| 9,337,935 | B2* | 5/2016 | Batshon | H04L 1/0056 |
| 9,397,786 | B2* | 7/2016 | Zhang | H04L 1/0063 |
| 9,407,398 | B2* | 8/2016 | Batshon | H04L 1/0063 |
| 9,590,833 | B2* | 3/2017 | Yu | H04L 27/2697 |
| 9,806,739 | B1* | 10/2017 | Kojima | H03M 7/30 |
| 9,900,105 | B1* | 2/2018 | Batshon | H04B 10/556 |
| 9,929,813 | B1* | 3/2018 | Batshon | H04B 10/516 |
| 10,560,289 | B1* | 2/2020 | Dave | H04B 10/616 |
| 2005/0220220 | A1 | 10/2005 | Belotserkovsky | H04L 27/38 |
| | | | | 375/316 |
| 2008/0019460 | A1* | 1/2008 | Giles | H04L 25/4917 |
| | | | | 375/308 |
| 2009/0324253 | A1* | 12/2009 | Winzer | H04B 10/505 |
| | | | | 398/185 |
| 2010/0008679 | A1* | 1/2010 | Cole | H04B 10/58 |
| | | | | 398/185 |
| 2010/0239267 | A1* | 9/2010 | Kikuchi | H04L 27/2096 |
| | | | | 398/156 |
| 2011/0052215 | A1* | 3/2011 | Zhou | H04B 10/60 |
| | | | | 398/208 |
| 2012/0294630 | A1* | 11/2012 | Zhou | H04B 10/6164 |
| | | | | 398/208 |
| 2013/0138375 | A1* | 5/2013 | Zhou | H04B 10/6166 |
| | | | | 702/66 |
| 2013/0154755 | A1* | 6/2013 | Eroz | H04L 27/34 |
| | | | | 332/144 |
| 2014/0147117 | A1* | 5/2014 | Kikuchi | H04B 10/2507 |
| | | | | 398/65 |
| 2014/0270810 | A1* | 9/2014 | Nakashima | H04B 10/6164 |
| | | | | 398/208 |
| 2015/0086216 | A1* | 3/2015 | Xie | H04B 10/0795 |
| | | | | 398/186 |
| 2016/0006515 | A1* | 1/2016 | Kojima | H04B 10/508 |
| | | | | 398/193 |
| 2016/0127046 | A1* | 5/2016 | Zhang | H04L 27/183 |
| | | | | 398/185 |
| 2016/0352419 | A1* | 12/2016 | Fonseka | H03M 13/2775 |
| 2016/0373190 | A1* | 12/2016 | Reimer | H04B 10/5561 |
| 2017/0134096 | A1* | 5/2017 | Zheng | H04B 10/50575 |
| 2017/0170846 | A1* | 6/2017 | Ikegaya | H04B 10/2507 |
| 2018/0227161 | A1* | 8/2018 | Zhang | H04L 27/3488 |
| 2018/0269979 | A1* | 9/2018 | Zhang | H04B 10/5161 |
| 2018/0269983 | A1* | 9/2018 | Karar | H04L 27/3411 |
| 2020/0366375 | A1* | 11/2020 | Zhou | H04B 10/541 |

OTHER PUBLICATIONS

Xiang Zhou, "Efficient Clock and Carrier Recovery Algorithms for Single-Carrier Coherent Optical Systems," IEEE Signal Processing Magazine Mar. 2014, pp. 35-45.

Yu, et al. "Symbol Error Rate Comparisons of Star MQAM Schemes Based on Equal Cubic Metric." 2014 IEEE 21st International Conference on Telecommunications (ICT), Beijing, China, 2014, pp. 369-373.

Das (Nandan), et al. "NDA SNR Estimation for 32APSK in AWGN." 2008 IEEE, pp. 331-335.

Lu et al. Frequency Offset Estimation for 32-QAM Based on Constellation Rotation. IEEE Photonics Technology Letters, IEEE Service Center, Piscataway, NJ, US, vol. 29, No. 23, Dec. 1, 2017 (Dec. 1, 2017), pp. 2115-2118, XP011673073, ISSN: 1041-1135, DOI: 10.1109/LPT.2017.2765659.

Zhou et al. Beyond 1 Tb/s Intra-Data Center Interconnect Technology: IM-DD or Coherent? Journal of Lightwave Technology, IEEE, USA, vol. 38, No. 2, Nov. 28, 2019 (Nov. 28, 2019), pp. 475-484, XP011767400, ISSN: 0733-8724, DOI: 10.1109/JLT.2019.2956779.

Invitation to Pay Additional Fees for International Application No. PCT/US2019/065004 dated May 7, 2020. 16 pages.

International Preliminary Report on Patentability for International Application No. PCT/US2019/065004 dated Jun. 29, 2020. 21 pages.

Office Action for Taiwanese Patent Application No. 108143362 dated Dec. 23, 2020. 8 pages.

* cited by examiner

PHASE NOISE TOLERANT COHERENT MODULATION FORMATS FOR SHORT REACH OPTICAL COMMUNICATION SYSTEMS

BACKGROUND

The ever growing bandwidth demands in communication systems continue to drive the need for higher-speed optical interconnection networks. To scale the interconnection interface bandwidth beyond, for example, 1 Tb/s, more bandwidth-efficient communication systems are likely needed to accommodate the bandwidth demands.

Optical coherent communications allow information to be encoded in the phase and/or frequency in addition to amplitude of an optical signal. Such systems allow for complex modulation in which a single symbol can encode two or more bits of information. Among various coherent modulation formats that are being developed, 5 bits per symbol (per polarization) 2-D coherent modulation formats appear to be the most promising formats. Since these formats allow a single laser to transmit, for example, about 800 Gb/s capacity by using ~40 GHz optical and electrical component bandwidth, systems based on these formats offer the most likely success. However, currently available 5 bits per symbol coherent modulation formats are insufficient to accommodate the bandwidth demands due to various noise and tolerance issues with the formats.

SUMMARY

One aspect of the disclosure is directed to an optical transponder. The optical transponder includes a processor configured to modulate a drive signal to be output to a coherent optical transmitter and/or to demodulate a sampled electric signal received from a coherent optical receiver using a two-dimensional 5-bit symbol coding/decoding constellation. The constellation includes a first ring having a radius $R1$, as second ring having a radius $R2$, a third ring having a radius $R3$, and a fourth ring having a radius $R4$. The first ring includes a first four symbol sub-constellation employing a quadrature phase-shift keying. The second ring includes a first twelve symbol sub-constellation employing a phase-shift keying. The third ring includes a second twelve symbol sub-constellation employing the same phase-shift keying employed for the second ring. The fourth ring includes a second four symbol sub-constellation employing the same quadrature phase-shift keying employed for the first ring.

In some implementations, both the first four symbol sub-constellation and the second four symbol sub-constellation have equal in-phase and quadrature components. In some implementations, $R1$ is less than $R2$, which is less than $R3$, which is less than $R4$. In some implementations, the ratios of $R1$ to $R2$, $R3$, and $R4$ are $R2/R1 \approx 2.4$, $R3/R1 \approx 3.75$; and $R4/R1 \approx 5.12$, respectively.

In some implementations, eight symbols from the second twelve symbol sub-constellation and the second four symbol sub-constellation are arranged to form a square. In some implementations, the minimum phase distance between any two symbols in the constellation is about 30°. In some implementations, the peak amplitudes along both the quadrature and in-phase axes of the constellation are 5.0, and the minimum Euclidean distance between any two symbols in the constellation is about 2.0.

Another aspect of the disclosure is directed to a method of encoding a data stream onto an optical signal. The method includes receiving a data stream to be transmitted, decomposing the data stream into a plurality of 5-bit symbols, converting the plurality of 5-bit symbols using a 5-bit constellation into a plurality of quadrature and in-phase modulation drive signals, and driving an optical modulator with the modulation drive signals to modulate an optical carrier wave. The constellation used in the method includes a first ring having a radius $R1$, as second ring having a radius $R2$, a third ring having a radius $R3$, and a fourth ring having a radius $R4$. The first ring includes a first four symbol sub-constellation employing a quadrature phase-shift keying. The second ring includes a first twelve symbol sub-constellation employing a phase-shift keying. The third ring includes a second twelve symbol sub-constellation employing the same phase-shift keying employed for the second ring. The fourth ring includes a second four symbol sub-constellation employing the same quadrature phase-shift keying employed for the first ring.

In some implementations, both the first four symbol sub-constellation and the second four symbol sub-constellation have equal in-phase and quadrature components. In some implementations, $R1$ is less than $R2$, which is less than $R3$, which is less than $R4$. In some implementations, the ratios of $R1$ to $R2$, $R3$, and $R4$ are $R2/R1 \approx 2.4$, $R3/R1 \approx 3.75$; and $R4/R1 \approx 5.12$, respectively.

In some implementations, eight symbols from the second twelve symbol sub-constellation and the second four symbol sub-constellation are arranged to form a square. In some implementations, the minimum phase distance between any two symbols in the constellation is about 30°. In some implementations, the peak amplitudes along both the quadrature and in-phase axes of the constellation are 5.0, and the minimum Euclidean distance between any two symbols in the constellation is about 2.0.

Another aspect of the disclosure is directed to a method of decoding a data stream from an electrical signal output by a coherent optical receiver. The method includes receiving the data stream to be decoded, decoding the data stream using a 5-bit constellation into a plurality of symbols, and outputting a stream of bits corresponding to the plurality of symbols. The constellation used in the method includes a first ring having a radius $R1$, as second ring having a radius $R2$, a third ring having a radius $R3$, and a fourth ring having a radius $R4$. The first ring includes a first four symbol sub-constellation employing a quadrature phase-shift keying. The second ring includes a first twelve symbol sub-constellation employing a phase-shift keying. The third ring includes a second twelve symbol sub-constellation employing the same phase-shift keying employed for the second ring. The fourth ring includes a second four symbol sub-constellation employing the same quadrature phase-shift keying employed for the first ring.

In some implementations, both the first four symbol sub-constellation and the second four symbol sub-constellation have equal in-phase and quadrature components. In some implementations, $R1$ is less than $R2$, which is less than $R3$, which is less than $R4$. In some implementations, the ratios of $R1$ to $R2$, $R3$, and $R4$ are $R2/R1 \approx 2.4$, $R3/R1 \approx 3.75$; and $R4/R1 \approx 5.12$, respectively.

In some implementations, eight symbols from the second twelve symbol sub-constellation and the second four symbol sub-constellation are arranged to form a square. In some implementations, the minimum phase distance between any two symbols in the constellation is about 30°. In some implementations, the peak amplitudes along both the quadrature and in-phase axes of the constellation are 5.0, and the minimum Euclidean distance between any two symbols in the constellation is about 2.0.

Another aspect of the disclosure is directed to an optical transponder that includes a processor configured to modulate a drive signal to be output to a coherent optical transmitter and/or to demodulate a sampled electric signal received from a coherent optical receiver using a two-dimensional 5-bit symbol coding/decoding quadrature amplitude modulation constellation. The constellation includes a quadrature axis, an in-phase axis, an inner sub-constellation and an outer sub-constellation. The inner sub-constellation includes 16 symbols. Each of the 16 symbols is equally spaced from its nearest neighboring symbols along both the quadrature and in-phase axes. The outer sub-constellation includes 16 symbols. Each of the 16 symbols has an equal Euclidean-distance from its nearest neighboring symbols in the outer sub-constellation.

In some implementations, the Euclidean distance between neighboring symbols in the outer sub-constellation is greater than the in-phase and quadrature distances separating symbols in the inner sub-constellation. In some implementations, the maximum amplitudes along the quadrature and in-phase axes are 5.0, and the Euclidean distance between neighboring symbols in the outer sub-constellation is 2.26. In some implementations, at least one of the in-phase or quadrature values of each of the symbols in the outer sub-constellation is off-set from the in-phase or quadrature values of any of the symbols in the inner sub-constellation.

Another aspect of the disclosure is directed to a method of encoding a data stream onto an optical signal. The method includes receiving a data stream to be transmitted, decomposing the data stream into a plurality of 5-bit symbols, converting the plurality of 5-bit symbols using a 5-bit quadrature amplitude modulation constellation into a plurality of quadrature and in-phase modulation drive signals, and driving an optical modulator with the modulation drive signals to modulate an optical carrier wave. The constellation used in the method includes a quadrature axis, an in-phase axis, an inner sub-constellation and an outer sub-constellation. The inner sub-constellation includes 16 symbols. Each of the 16 symbols is equally spaced from its nearest neighboring symbols along both the quadrature and in-phase axes. The outer sub-constellation includes 16 symbols. Each of the 16 symbols has an equal Euclidean-distance from its nearest neighboring symbols in the outer sub-constellation.

In some implementations, the Euclidean distance between neighboring symbols in the outer sub-constellation is greater than the in-phase and quadrature distances separating symbols in the inner sub-constellation. In some implementations, the maximum amplitudes along the quadrature and in-phase axes are 5.0, and the Euclidean distance between neighboring symbols in the outer sub-constellation is 2.26. In some implementations, at least one of the in-phase or quadrature values of each of the symbols in the outer sub-constellation is off-set from the in-phase or quadrature values of any of the symbols in the inner sub-constellation.

Another aspect of the disclosure is directed to a method of decoding a data stream from an electrical output by a coherent optical receiver. The method includes receiving the data stream to be decoded, decoding the data stream using a 5-bit quadrature amplitude modulation constellation into a plurality of symbols, and outputting a stream of bits corresponding to the plurality of symbols. The constellation used in the method includes a quadrature axis, an in-phase axis, an inner sub-constellation, and an outer sub-constellation. The inner sub-constellation includes 16 symbols. Each of the 16 symbols is equally spaced from its nearest neighboring symbols along both the quadrature and in-phase axes. The outer sub-constellation includes 16 symbols. Each of the 16 symbols has an equal Euclidean-distance from its nearest neighboring symbols in the outer sub-constellation.

In some implementations, the Euclidean distance between neighboring symbols in the outer sub-constellation is greater than the in-phase and quadrature distances separating symbols in the inner sub-constellation. In some implementations, the maximum amplitudes along the quadrature and in-phase axes are 5.0, and the Euclidean distance between neighboring symbols in the outer sub-constellation is 2.26. In some implementations, at least one of the in-phase or quadrature values of each of the symbols in the outer sub-constellation is off-set from the in-phase or quadrature values of any of the symbols in the inner sub-constellation.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
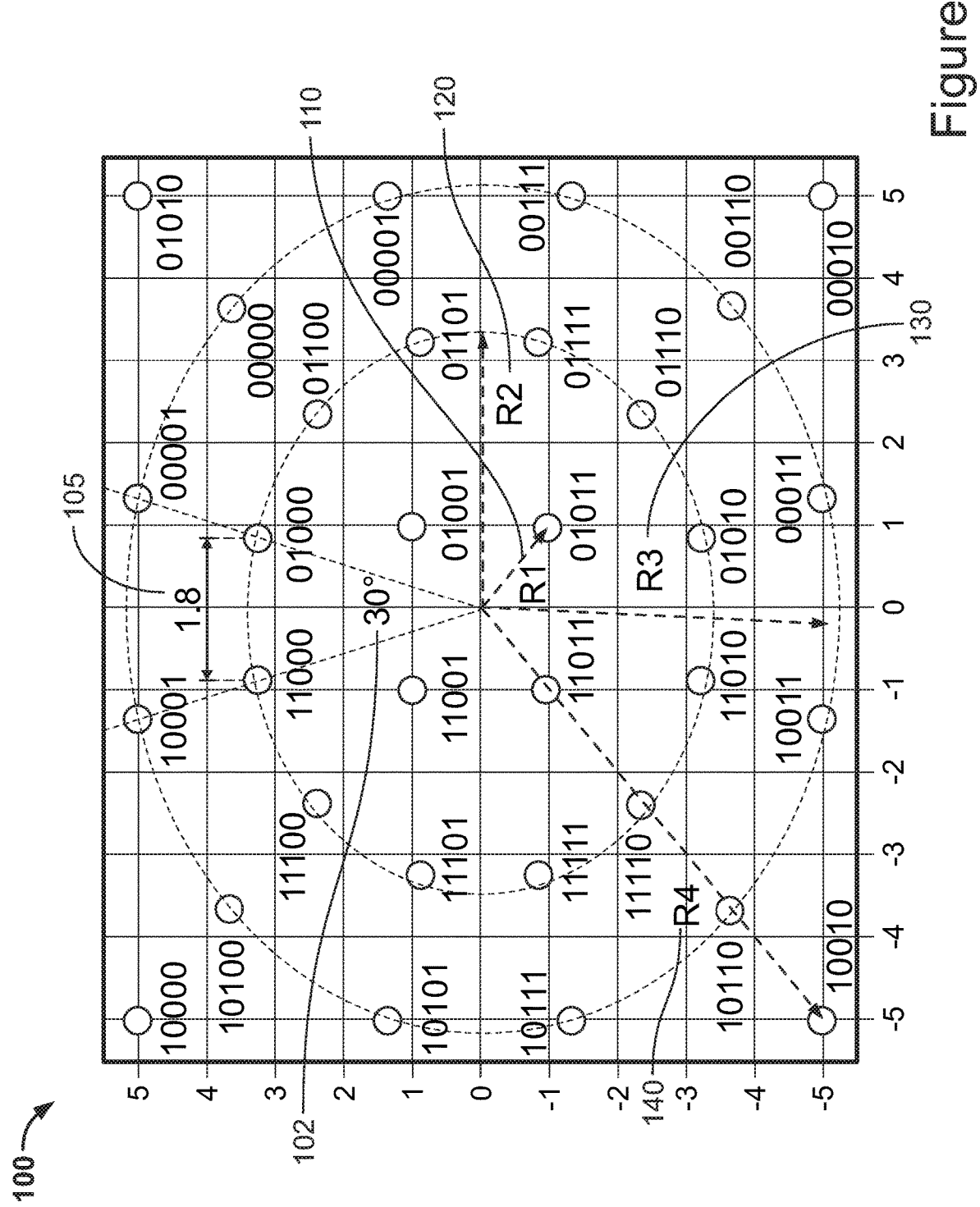
FIG. 1 is a graphical illustration of an example modulation format having a square constellation map, according to an illustrative implementation.

As described above, the 5 bits per symbol (per polarization) 2-D coherent modulation formats are promising optical modulation formats to achieve beyond a bandwidth of 800 Gb/s per wavelength and into the 1 Tb/s regime suitable to implement in datacenter interconnection networks.

The disclosed 5 bits per symbol coherent modulation formats include a square-32APSK (asymmetric phase-shift keying) format and a modified cross-32QAM (quadrature amplitude modulation) format, which is a modified version of the cross-32QAM format known in the art. As described herein, both the square-32APSK and the modified cross-32QAM are optimized for peak-power per dimension constrained short reach optical communication systems. For example, the square-32APSK increases the laser phase noise tolerance by more than 60% (under 1 dB @ $1e^{-3}$ sensitivity penalty) with only slightly degraded additive Gaussian noise tolerance (<0.3 dB @ $1e^{-3}$). Similarly, the modified cross-32QAM as disclosed herein can improve both phase noise tolerance and additive Gaussian noise tolerance. With improved noise performances and tolerances, the disclosed coherent modulation formats can be implemented without using costly narrow-linewidth laser systems. Without having to employ expensive laser systems, more cost-sensitive short reach optical communication systems can be constructed and implemented based on the two new modulation formats as disclosed herein.

The improved 5 bits per symbol coherent modulation formats disclosed herein have significant improvements over current state of the art 5-bit formats in terms of phase and noise tolerances. The first of those modulation formats is based on a widely used format known as cross-32QAM. The cross-32QAM formats are designed to have equal Euclidean distance between neighboring constellation points. These modulation formats are optimized for additive Gaussian noise tolerance under 2-D average power (including both the in-phase and quadrature dimensions) constrained communication systems. Due to the use of equal Euclidean distance design, however, this type of modulation formats has relatively poor phase noise tolerance since the phase error can cause larger Euclidean distance error for constellation points having larger amplitudes.

For cost-sensitive short reach optical communication applications, however, it is highly desirable to use lower-cost distributed feedback (DFB) lasers, which typically exhibit a linewidth between 1 MHz to 10 MHz. Such a laser linewidth results in significant performance penalty by using the known equal Euclidean distance modulation formats. For example, the use of cross-32QAM results in more than 3 dB signal-to-noise (SNR) penalty @ bit error rate (BER) of $1e^{-3}$ with a typical 2 MHz linewidth DFB laser.

The second of the current state-of-the-art modulation formats is based on circular-32APSK (also generally referred to as circular-32QAM) formats. The circular-32QAM formats typically include multiple rings with either equal constellation points on each ring, such as, for example a four-ring format based on the 4R-32APSK (8,8,8,8) format or a format based on more constellation points located on the outer rings, such as, for example a three-ring format based on the 3R-32APSK (4,12,16). These circular-32APSK modulation formats are optimized for 2-D peak-power (including both the in-phase and quadrature components) constrained communication systems.

For short-reach optical communication systems that are very sensitive to the modulator driver power consumption, receiver SNR in the circular-32QAM is typically constrained by the modulator drive swing, assuming a fixed laser power and a typical end-to-end link loss. Since the in-phase and quadrature optical signals are typically generated by parallel Mach-Zehnder modulators (MZM), such as an in-phase and a quadrature modulator, the in-phase and quadrature signal amplitudes are constrained independently by their corresponding drive swings. This is equivalent to a per dimension peak power/amplitude constrained communication system. For such a communication system, the traditional circular 32APSK modulation formats do not perform well in terms of additive Gaussian noise tolerance, such as the receiver thermal noise tolerance or the amplified spontaneous emission (ASE) noise tolerance. For example, 3R-32APSK (4,12,16) is about 2.2 dB worse than a common cross-32QAM, although their phase noise tolerance is similar. It has been shown that 4R-32APSK (8,8,8,8) can achieve better phase noise tolerance, but additive Gaussian noise tolerance is about 4.7 dB worse than the cross-32QAM.

The improved 5 bits per symbol 2-D coherent modulation formats as described herein are specifically optimized for per dimension peak power/amplitude constrained short reach coherent optical communication systems. In other words, the disclosed 5 bits per symbol coherent modulation formats are specifically configured to achieve aforementioned communication bandwidths without the aforementioned phase and noise tolerance issues.

FIG. 1 is a graphical illustration of an example modulation format having a square constellation map, according to an illustrative implementation. The format 100 shown in FIG. 1 is a square-32APSK modulation format 100. An exemplary symbol to bit mapping scheme is also shown with a five-digit numbering, where the Gray coding mapping principle is applied to the majority of the constellation points, which is similar to the conventional cross-32QAM. The square-32APSK 100 can be decomposed into four-ring-based sub-constellations having radii R1 110, R2 120, R3 130, and R4 140. The inner ring R1 110 and the outer ring R4 140 have a quadrature phase-shift keying (QPSK) constellation, and the two middle rings R2 120 and R3 130 have the same 12-PSK constellations. Both QPSK constellations have equal in-phase and quadrature components. As shown in FIG. 1, the ratio between R1 110, R2 120, R3 130, and R4 140 is given by: R2/R1≈2.4, R3/R1≈3.75; and R4/R1≈5.12.

In various implementations, the two 12-PSK and the two QPSK constellations are arranged in a way that the outer 16 constellation points make a square, as shown in FIG. 1. Such a square constellation arrangement allows greater minimum Euclidean distance and phase spacing for per dimension power/amplitude constrained communication systems.

Figures 2A, 2B, 2C:
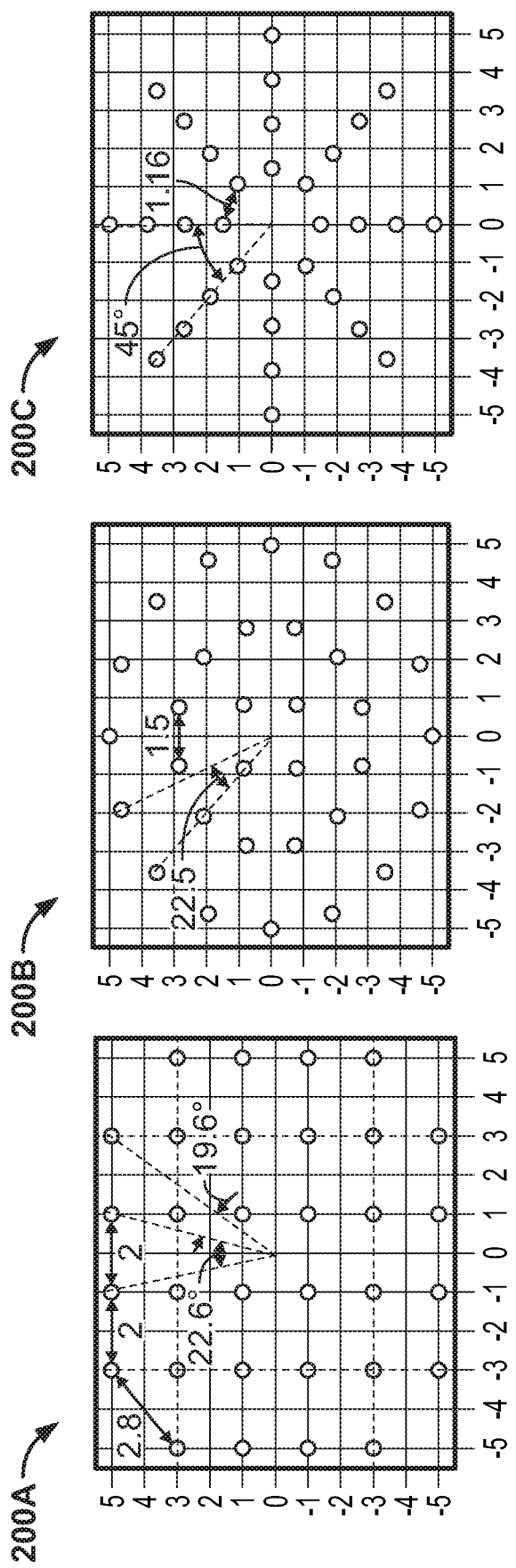
FIGS. 2A-2C are graphical illustrations of published modulation formats for comparison purposes.

FIGS. 2A-2C are graphical illustrations of published modulation formats included herein for comparison purposes. FIG. 2A shows a graphical illustration of a cross-32QAM modulation format 200A drawn under identical peak amplitudes of 5 in both the in-phase and the quadrature dimensions. FIG. 2B shows a graphical illustration of a circular 3R-32APSK modulation format (4, 12, 16) 200B drawn under identical peak amplitudes of 5 in both the in-phase and the quadrature dimensions. FIG. 2C shows a graphical illustration of a circular 4R-32APSK modulation format (8,8,8,8) 200C drawn under identical peak amplitudes of 5 in both the in-phase and the quadrature dimensions.

Compared to the conventionally known cross-32QAM modulation format 200A of FIG. 2A, the square-32APSK modulation format 100 of FIG. 1 is configured to increase the minimum phase spacing 102 from 19.6° to 30°, corresponding to about 53% increase, while a minimum Euclidean distance 105 is only reduced from 2 to 1.8, corresponding to about 11% reduction. In some implementations, the minimum phase spacing may be between 25° and 30°. In other implementations, the minimum phase spacing may be a different spacing greater than 19.6° and less than 30° without departing from the scope of the disclosure.

Compared to the known circular 3R-32APSK modulation format (4,12,16) 200B of FIG. 2B, the square-32APSK 100 of FIG. 1 is configured to achieve better performance in terms of both phase noise tolerance and additive Gaussian noise tolerance. This is achieved by increasing the minimum phase spacing 102 from 22.5° to 30° (or to some value greater than 22.5°, up to and including 30°) and by increasing the minimum Euclidean distance 105 from 1.5 to 1.8 in the square-32APSK modulation format 100.

Compared to the known 4R-32APSK modulation format (8,8,8,8) 200C of FIG. 2C, although the format 200C can achieve better phase noise performance, its additive Gaussian noise tolerance is about 3.8 dB worse than the square-32APSK modulation format 100 of FIG. 1 because the Euclidean distance 105 is 1.16 for the format 200C vs 1.8 for the format 100.

Figure 3:
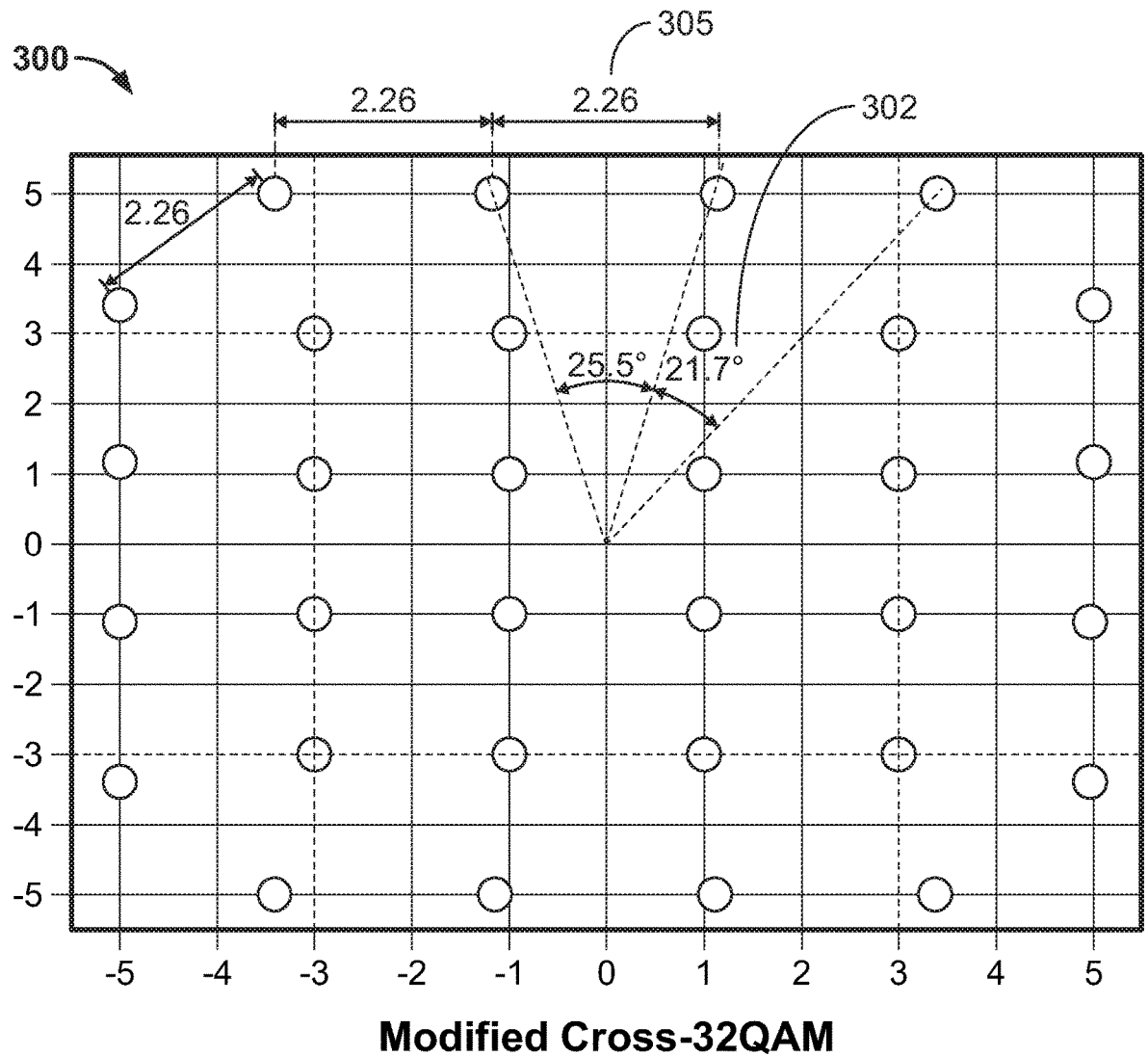
FIG. 3 is a graphical illustration of an example modulation format having a modified cross constellation map, according to an illustrative implementation.

FIG. 3 is a graphical illustration of an example modulation format 300 having a modified cross constellation map, according to an illustrative implementation. As shown in FIG. 3, the modified cross-32QAM modulation format 300 includes inner 16 constellation points (collectively referred to as an inner sub-constellation) that are positioned in the same constellation points as in the conventional cross-32QAM modulation format 200A shown in FIG. 2A. However, the modified cross-32QAM modulation format 300 includes outer 16 constellation points (collectively referred to as an outer sub-constellation) that are rearranged compared to the outer constellation points of the format 200A. As shown in FIG. 3, the modified cross-32QAM modulation format 300 has equal Euclidean distance between neighboring outer constellation points, which the format 200A does not have. In other words, the outer 16 constellation points of the conventional cross-32QAM format 200A are concentrated toward the center of the map, whereas the 16 outer constellation points in the modified cross-32QAM modulation format 300 are uniformly distributed. As a result, for a peak power/amplitude constrained shorter reach optical communication system, the modified cross-32QAM modulation format 300 is configured to increase a Euclidean distance 305 for the outer 16 constellation points by 13% (from 2 in conventional cross-32QAM modulation format 200A to 2.26 in modified cross-32QAM modulation format 300). Similarly, a minimum phase spacing 302 is increased by about 11% (from 19.6° in conventional cross-32QAM modulation format 200A to about 21.7° in modified cross-32QAM modulation format 300). The increase in the Euclidean distance 305 and minimum phase spacing 302 affect the performance in terms of improved tolerance toward both the phase noise and additive Gaussian noise.

In the format 300, the Euclidean distance between neighboring symbols in the outer sub-constellation is greater than the in-phase and quadrature distances separating symbols in the inner sub-constellation. In a format where the maximum amplitudes along the quadrature and in-phase axes are 5.0, the Euclidean distance between neighboring symbols in the outer sub-constellation is 2.26. In addition, at least one of the in-phase or quadrature values of each of the symbols in the outer sub-constellation is off-set from the in-phase or quadrature values of any of the symbols in the inner sub-constellation.

It would be understood that while each of the modulation formats discussed herein assumes peak quadrature and in-phase amplitudes of 5.0, other peak amplitudes may be used, with corresponding symbol coordinates being scaled appropriately.

Table 1 below shows comparison between the five 5 bits per symbol 2-D coherent modulation formats (100, 200A, 200B, 200C and 300) in terms of minimum Euclidean distance, minimum phase distance, as well as the underlying constellation optimization methodology. As described herein, the modulation format 100 shown in FIG. 1 and modulation format 300 shown in FIG. 3 are optimized for phase noise tolerance for per dimension peak power/amplitude constrained systems. Specifically, the modulation format 100 shown in FIG. 1 is configured to allow up to 1 dB AWGN Gaussian noise tolerance degradation in order to achieve higher phase noise tolerance. In contrast, the modulation format 300 shown in FIG. 3 is configured to improve the phase noise tolerance without degrading AWGN noise tolerance.

TABLE 1

5 bits per symbol coherent modulation format comparison

| | Square-32APSK modulation format 100 (FIG. 1) | Modified cross-32 QAM modulation format 300 (FIG. 3) | Known cross-32 QAM modulation format 200A (FIG. 2A) | Known circular 3R-32APSK modulation format 200B (FIG. 2B) | Known 4R-32APSK modulation format 200C (FIG. 2C) |
|---|---|---|---|---|---|
| Minimum Euclidean distance (Metrics for AWGN noise tolerance, assume maximum amplitude in each dimension is 5) | 1.8 | 2 | 2 | 1.5 | 1.16 |
| Minimum phase distance (degree) (Metrics for phase noise tolerance) | 30 | 21.7 | 19.6 | 22.5 | 45 |
| Optimization methodology | Optimizing phase noise tolerance with <1 dB AWGN noise tolerance degradation for per dimension (in-phase and | Optimizing phase noise tolerance without degrading AWGN noise tolerance for per dimension (in-phase and | Optimizing AWGN noise tolerance without considering phase noise tolerance for average power constrained systems | Optimizing phase noise tolerance with <3 dB AWGN noise degradation for average power constrained systems | Optimizing phase noise tolerance without considering AWGN noise tolerance for average power constrained systems |

TABLE 1-continued 5 bits per symbol coherent modulation format comparison

| Square-32APSK modulation format 100 (FIG. 1) | Modified cross-32 QAM modulation format 300 (FIG. 3) | Known cross-32 QAM modulation format 200A (FIG. 2A) | Known circular 3R-32APSK modulation format 200B (FIG. 2B) | Known 4R-32APSK modulation format 200C (FIG. 2C) |
|---|---|---|---|---|
| quadrature) peak amplitude/ power constrained systems | quadrature) peak amplitude/ power constrained systems | | | |

The constellation points for each of the modulation formats can be described using the following relationships. For example, the square-32APSK modulation format 100 shown in FIG. 1 (assume the peak amplitude at each dimension is constrained to 5) can be described as $$R_n e^{j\theta_{nm}},$$

where $R_1 = 1.38$, $R_2 = 3.35$, $R_3 = 5.18$, and $R_4 = 7.07$, while $\theta_{1m} = m\left(\frac{\pi}{2}\right) + \frac{\pi}{4}$, with $m = 0, 1, 2,$ and 3

$\theta_{2m} = m\left(\frac{\pi}{6}\right) + \frac{\pi}{12}$, with $m = 0, 1, 2, \ldots, 11$ $\theta_{3m} = m\left(\frac{\pi}{6}\right) + \frac{\pi}{12}$, with $m = 0, 1, 2, \ldots, 11$ $\theta_{4m} = m\left(\frac{\pi}{2}\right) + \frac{\pi}{4}$, with $m = 0, 1, 2,$ and 3.

The constellation points for the modified cross-32QAM modulation format 300 shown in FIG. 3 (assume the peak amplitude at each dimension is constrained to 5) have the same inner 16 points as the regular square-16QAM, which has equal spacing of 2.0 along the quadrature and in-phase axes between any adjacent constellation points. In addition, in the modulation format 300, the outer 16 constellation points have equal spacing of 2.26 between any adjacent constellation points of the 16 constellation points in the outer sub-constellation. The Euclidean distance between any one of the 16 outer constellation points to any one of the inner 16 constellation points is either equal to 2 or larger than 2.

In order to demonstrate the effectiveness and improvements of the square-32APSK modulation format 100 and the modified cross-32QAM modulation format 300, the results of laser phase noise and additive Gaussian noise tolerance simulation studies are included herein.

Figure 4:
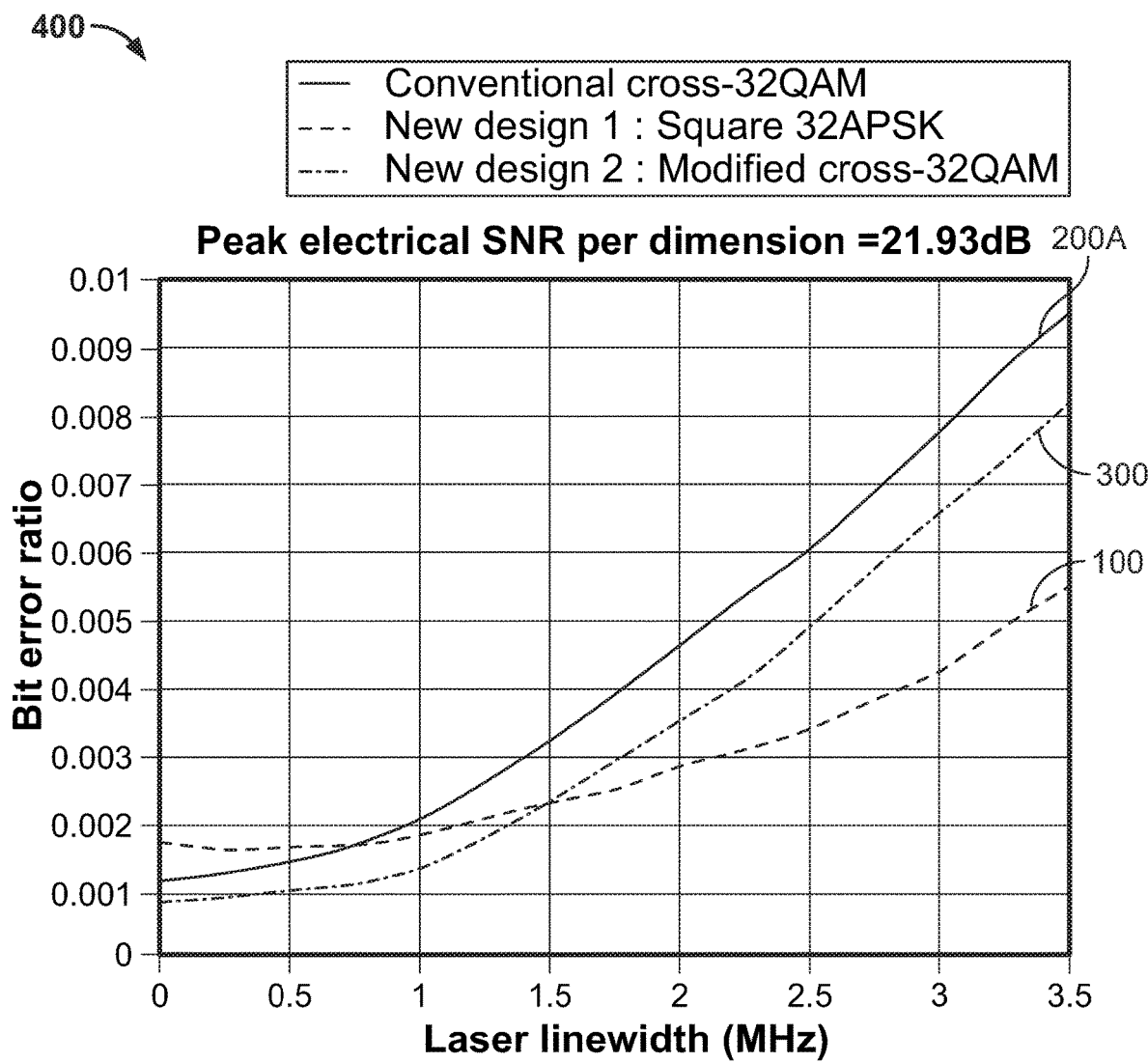
FIG. 4 is a performance plot of simulated BER as a function of laser linewidth for three modulation formats, according to an illustrative implementation.

FIG. 4 is a performance plot 400 of simulated bit error rate (BER) as a function of laser linewidth for three modulation formats, according to an illustrative implementation. Specifically, FIG. 4 shows the impact of laser linewidth on the square-32APSK modulation format 100 and the modified cross-32QAM modulation format 300 under a fixed peak electrical SNR per dimension 21.93 dB. For comparison, the result for the popular cross-32QAM modulation format 200A is also displayed. As shown in the plot 400 of FIG. 4, the modified cross-32QAM modulation format 300 performs best when the laser linewidth is smaller than 1.5 MHz and the square-32APSK modulation format 100 performs best when the laser linewidth is more than 1.5 MHz. For this simulation, a training-assisted two-stage phase recovery method is used for phase estimation, where training symbols (outermost QPSK symbols) are periodically inserted after every 31 signal symbols. Coarse phase is directly estimated from the inserted training symbols and then a maximum likelihood phase recovery stage is followed to refine the phase estimation.

Figure 5A:
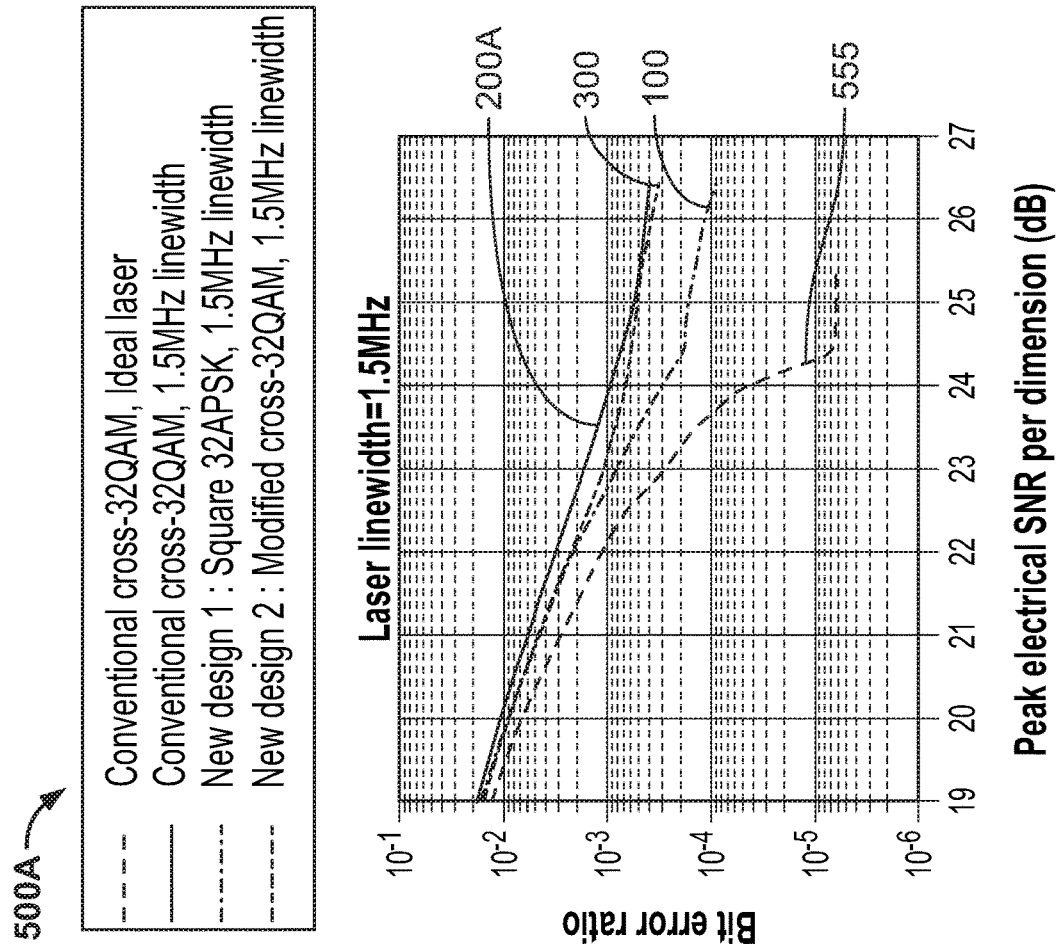
FIG. 5A is a performance plot of simulated BER as a function of peak electrical signal-to-noise ratio at 1.5 MHz for three modulation formats, according to an illustrative implementation.

FIG. 5A is a performance plot of simulated BER as a function of peak electrical signal-to-noise ratio at 1.5 MHz for three modulation formats, according to an illustrative implementation. For comparison, the result with ideal laser (no phase noise) is also displayed as dashed line 555. As shown in FIG. 5A, for the 1.5 MHz laser linewidth, the SNR penalty at BER 1e$^{-3}$ is about 0.5 dB for the square-32APSK modulation format 100, 0.8 dB for the modified cross-32QAM modulation format 300, and 1.8 dB for the known cross-32QAM modulation format 200A.

Figure 5B:
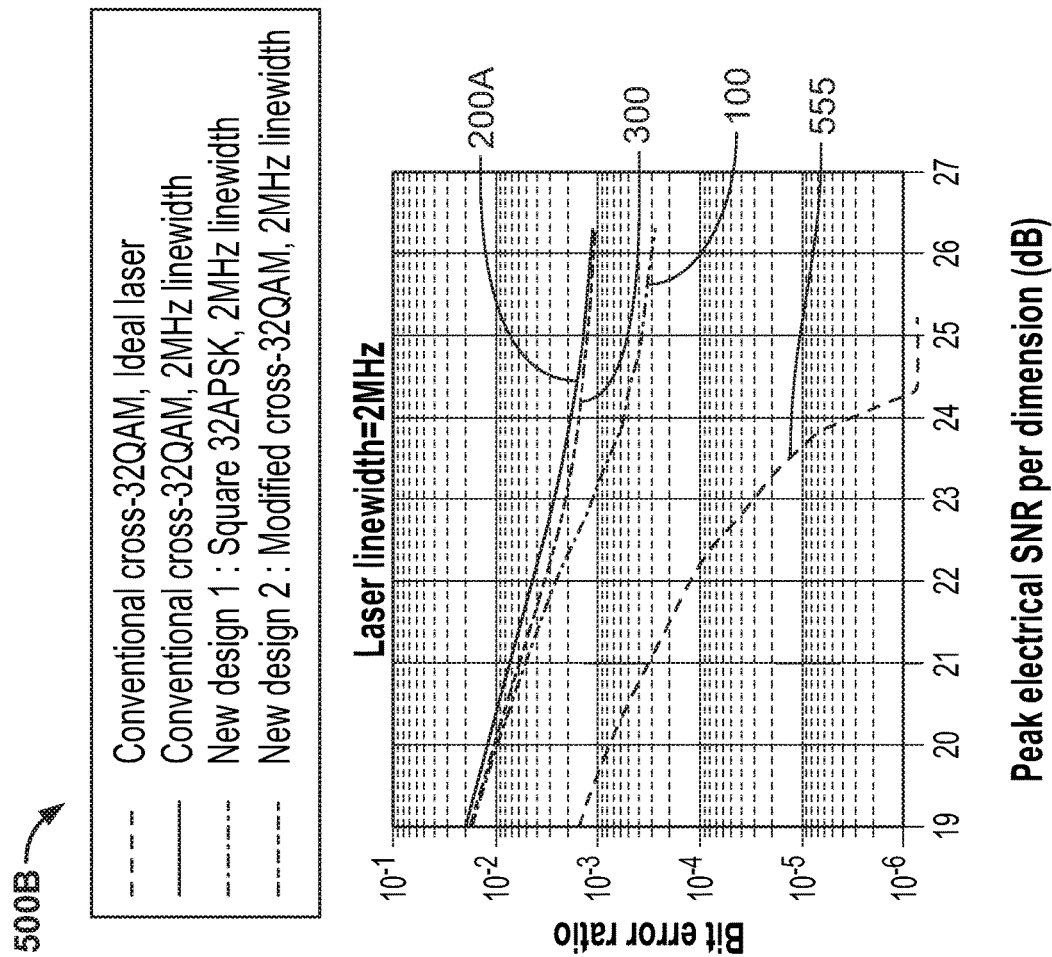
FIG. 5B is a performance plot of simulated BER as a function of peak electrical signal-to-noise ratio at 2.0 MHz for three modulation formats, according to an illustrative implementation.

FIG. 5B is a performance plot of simulated BER as a function of peak electrical signal-to-noise ratio at 2.0 MHz for three modulation formats, according to an illustrative implementation. For comparison, the result with ideal laser (no phase noise) is also displayed as dashed line 555. As shown in FIG. 5A, for the 2 MHz laser linewidth, the SNR penalty at BER 1e$^{-3}$ is about 4 dB for the known cross-32QAM modulation format 200A, about 1 dB penalty for the square-32APSK modulation format 100.

As described herein, the square-32APSK modulation format 100 and the modified cross-32QAM modulation format 300 are improved coherent 2-D modulation formats suitable for per dimension peak power constrained short reach coherent optical communication systems. The square-32APSK modulation format 100 can be configured to achieve significantly better laser phase noise tolerance than the common/known cross-32QAM modulation formats with only slightly degraded additive Gaussian noise tolerance. The modified cross-32QAM modulation format 300 can be configured to achieve better performance than the common cross-32QAM modulation formats in terms of both phase noise tolerance and additive Gaussian noise tolerance. The square-32APSK modulation format 100 and the modified cross-32QAM modulation format 300 can enable the use of lower-cost DFB lasers for cost-sensitive short reach coherent optical communication systems.

Figure 6:
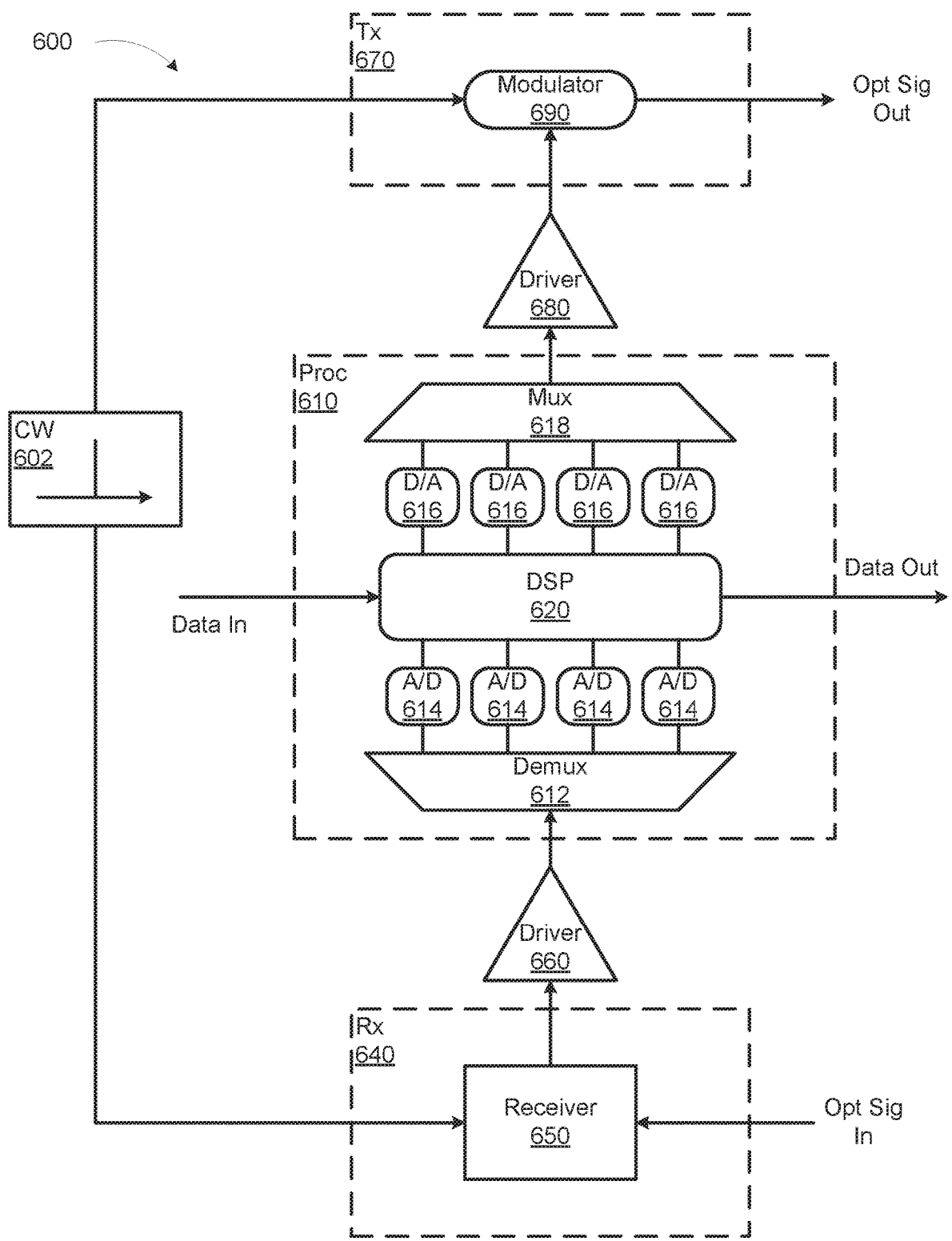
FIG. 6 is a block diagram of an example optical transponder 600 suitable for implementing the constellations described in relation to FIGS. 1 and 3.

FIG. 6 is a block diagram of an example optical transponder 600 suitable for implementing the constellations described in relation to FIGS. 1 and 3. The optical transponder 600 includes a processor 610 receiving data from a receiver module 640 and providing data to a transmitter module 670. A continuous-wave light source 602 provides a carrier to the transmitter module 670. The same source 602 or a second source can provide the same or a similar carrier to the receiver module 640. For simplicity, FIG. 6 has used a single block to represent multiple similar components. For example, the drivers 680 and 660 each represent four individual amplifiers respectively amplifying four distinct analog signals. Also, the modulator 690 would include four inputs, and the receiver 650 would include four outputs. These four signals can represent two polarizations times two quadratures.

The continuous-wave (CW) light source 602 can be an optical laser. An ideal CW laser would emit a single wavelength only and thus provide a single optical carrier for the transmitter module 670. In some cases, the CW light source 602 can be split and reused to serve as a local oscillator for the receiver module 640.

The receiver module 640 uses the carrier provided by the source 602 to down convert an incoming optical signal to an electrical signal. The receiver module 640 includes a receiver 650. The receiver 650 can be a dual polarization integrated coherent receiver (DP-ICR). The DP-ICR can include two 90-degree hybrids and a photodetector. The photodetector can be a set of high-speed balanced photodiodes.

The receiver module 640 provides its output electrical signal to the processor 610 via a driver 660. The driver 660 amplifies the signal from the photodetector. In some cases, the driver 660 can be a transimpedance amplifier that converts the current signal from the photodetector to a voltage signal for digitization at the analog-to-digital converters 614 of the processor 610.

The processor 610 receives the down converted electrical signal from the receiver module 640 via the driver 660. The processor 610 includes a demultiplexer 612, a plurality of analog-to-digital converters (ADCs) 614 and a digital signal processor (DSP) 620. The demultiplexer 612 splits the down converted electrical signal (as amplified by the driver 660) into multiple analog electrical signals for sampling by the ADCs 614. The ADCs 614 digitize the multiple analog electrical signals and provide the parallelized sampled signal to the DSP 620 for processing. The DSP 620 completes demodulation to recover the payload data. For example, the DSP is configured to use either the format 100 or the format 300 for demodulating the sampled signals. More particularly, the DSP 620 evaluates the quadrature and in-phase components of the sampled signals in relation to coordinates of the symbols in the format it is configured to use for demodulation.

The DSP 620 also processes a data signal for optical transmission from the transponder 600. The DSP 620 processes the data signal into parallelized digital electrical signals. The DSP 620 is configured to use either the format 100 or the format 300 to convert digital symbols into desired drive values. The processor 610 includes digital-to-analog converters (DACs) 616 and a multiplexer 618. The DACs 616 convert the digital signals output by the DSP 620 into analog electrical signals. The multiplexer 618 combines the analog electrical signals and provides them to the transmitter module 670 via the driver 680. The driver 680 amplifies the combined analog electrical signal to a level adequate to drive the modulator of the transmitter module 670.

The transmitter module 670 uses the carrier provided by the source 602 to up convert an outgoing combined analog electrical signal from the processor 610 into an outgoing optical signal. The transmitter module 670 includes a modulator 690. The modulator 690 can be a dual polarization inphase quadrature Mach Zehnder Modulator (DP-MZM). The modulator 690 encodes the combined analog electrical signal onto the carrier provided by the source 602 and outputs the optical signal.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

The invention claimed is:

1. An optical transponder comprising:
a processor configured to modulate a drive signal to be output to a coherent optical transmitter and/or to demodulate a sampled electric signal received from a coherent optical receiver using a two-dimensional 5-bit symbol coding/decoding quadrature amplitude modulation constellation, the constellation comprising:
a quadrature axis;
an in-phase axis;
an inner sub-constellation including 16 symbols, each of the 16 symbols equally spaced from its nearest neighboring symbols along both the quadrature and in-phase axes;
an outer sub-constellation including 16 symbols, each of the 16 symbols having an equal Euclidean-distance with its nearest neighboring symbols in the outer sub-constellation.

2. The optical transponder of claim 1, wherein the Euclidean distance between neighboring symbols in the outer sub-constellation is greater than the in-phase and quadrature distances separating symbols in the inner sub-constellation.

3. The optical transponder of claim 1, wherein the maximum amplitudes along the quadrature and in-phase axes are 5.0, and the Euclidean distance between neighboring symbols in the outer sub-constellation is 2.26.

4. The optical transponder of claim 1, wherein at least one of the in-phase or quadrature values of each of the symbols in the outer sub-constellation is off-set from the in-phase or quadrature values of any of the symbols in the inner sub-constellation.

5. A method of encoding a data stream onto an optical signal comprising:
   receiving a data stream to be transmitted;
   decomposing the data stream into a plurality of 5-bit symbols;
   converting the plurality of 5-bit symbols using a 5-bit quadrature amplitude modulation constellation into a plurality of quadrature and in-phase modulation drive signals, wherein the constellation comprises:
      a quadrature axis;
      an in-phase axis;
      an inner sub-constellation including 16 symbols, each of the 16 symbols equally spaced from its nearest neighboring symbols along both the quadrature and in-phase axes;
      an outer sub-constellation including 16 symbols, each of the 16 symbols having an equal Euclidean-distance with its nearest neighboring symbols in the outer sub-constellation; and
   driving an optical modulator with the modulation drive signals to modulate an optical carrier wave.

6. The method of claim 5, wherein the Eucludean distance between neighboring symbols in the outer sub-constellation is greater than the in-phase and quadrature distances separating symbols in the inner sub-constellation.

7. The method of claim 5, wherein the maximum amplitudes along the quadrature and in phase axes are 5.0, and the Euclidean distance between neighboring symbols in the outer sub-constellation is 2.26.

8. The method of claim 5, wherein at least one of the in-phase or quadrature values of each of the symbols in the outer sub-constellation is off-set from the in-phase or quadrature values of any of the symbols in the inner sub-constellation.

9. A method of decoding a data stream from an electrical output by a coherent optical receiver comprising:
   receiving the data stream to be decoded;
   decoding the data stream using a 5-bit quadrature amplitude modulation constellation into a plurality of symbols, wherein the constellation comprises:
      a quadrature axis;
      an in-phase axis;
      an inner sub-constellation including 16 symbols, each of the 16 symbols equally spaced from its nearest neighboring symbols along both the quadrature and in-phase axes;
      an outer sub-constellation including 16 symbols, each of the 16 symbols having an equal Euclidean-distance with its nearest neighboring symbols in the outer sub-constellation; and
   outputting a stream of bits corresponding to the plurality of symbols.

* * * * *